United States Patent [19]
Parker et al.

[11] Patent Number: 5,901,760
[45] Date of Patent: May 11, 1999

[54] AUTOMOTIVE FUEL FILLER PIPE BALL VALVE ASSEMBLY

[75] Inventors: Eric G. Parker, Chicago, Ill.; Craig L. Simdon, Cambridge, Wis.; Jason K. Trotter, Arurora, Ill.

[73] Assignee: Illinois Tool Works Inc., Glenview, Ill.

[21] Appl. No.: 08/991,793

[22] Filed: Dec. 12, 1997

[51] Int. Cl.$^6$ ........................................................ B65B 1/04
[52] U.S. Cl. ......................... 141/312; 141/301; 220/86.2
[58] Field of Search .................................... 141/312, 301; 220/86.2

[56] References Cited

U.S. PATENT DOCUMENTS

| | | |
|---|---|---|
| 3,083,725 | 4/1963 | Moen . |
| 3,729,170 | 4/1973 | Lewis et al. . |
| 4,532,969 | 8/1985 | Kwaan . |
| 5,255,721 | 10/1993 | Brand . |
| 5,271,880 | 12/1993 | Lindsay . |
| 5,466,016 | 11/1995 | Briody et al. . |
| 5,547,099 | 8/1996 | Chang . |
| 5,579,732 | 12/1996 | Hajek . |

*Primary Examiner*—Steven O. Douglas
*Attorney, Agent, or Firm*—Schwartz & Weinrieb

[57] ABSTRACT

An automotive fuel filler pipe ball valve assembly mountable in an opening of an automotive body panel. The assembly includes a housing member having a ball valve receptacle communicating with a housing inlet opening and a housing outlet opening, and a ball valve member having a passage with an inlet opening and an outlet opening. The ball valve member includes a stem member extending through an opening in the housing member, wherein the stem member is engageable by an actuation member to pivot the ball valve member in the housing member, thereby opening and closing the ball valve assembly. One or more sealing members form leak-proof seals between the housing member and the ball valve member. The assembly is mountable onto the body panel by resilient engagement members breakable to separate the housing member from the automotive body panel during impact.

20 Claims, 3 Drawing Sheets

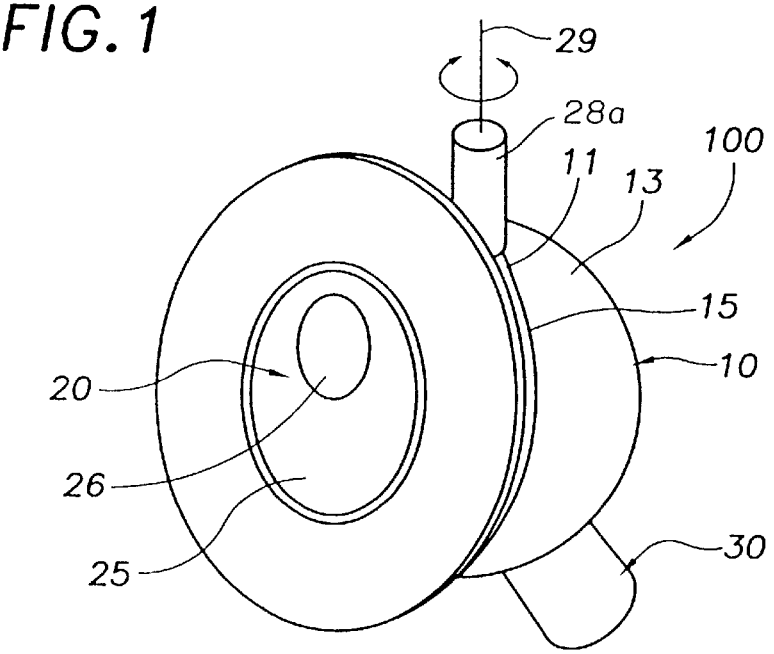
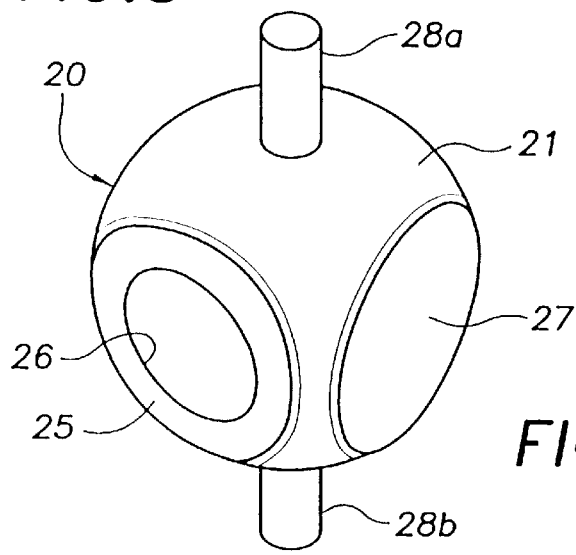
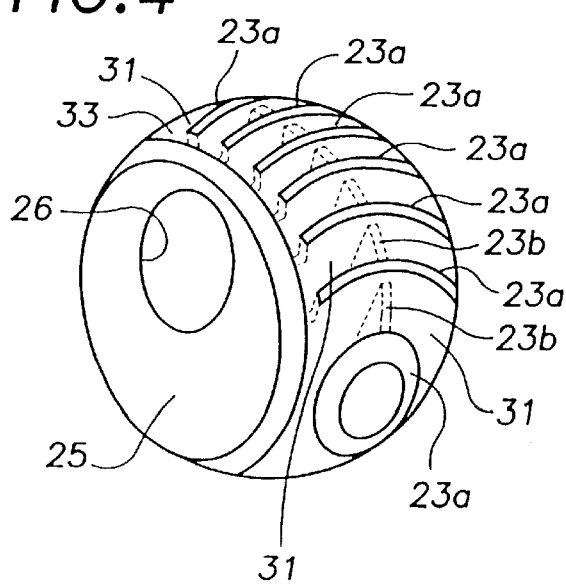

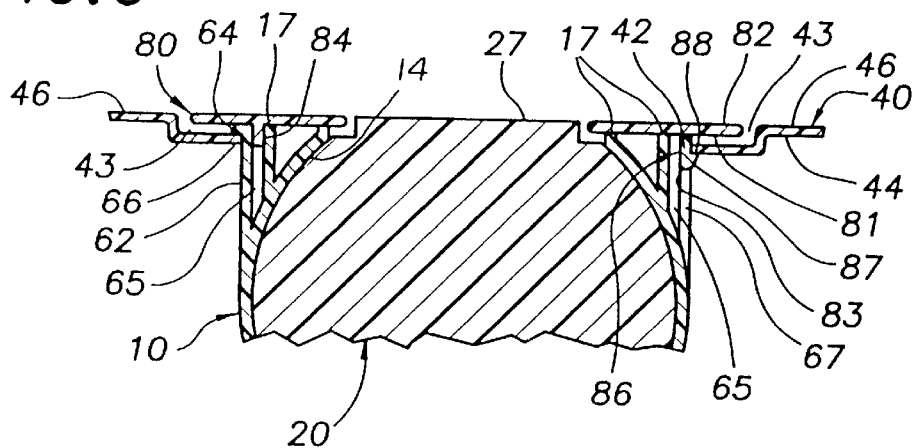
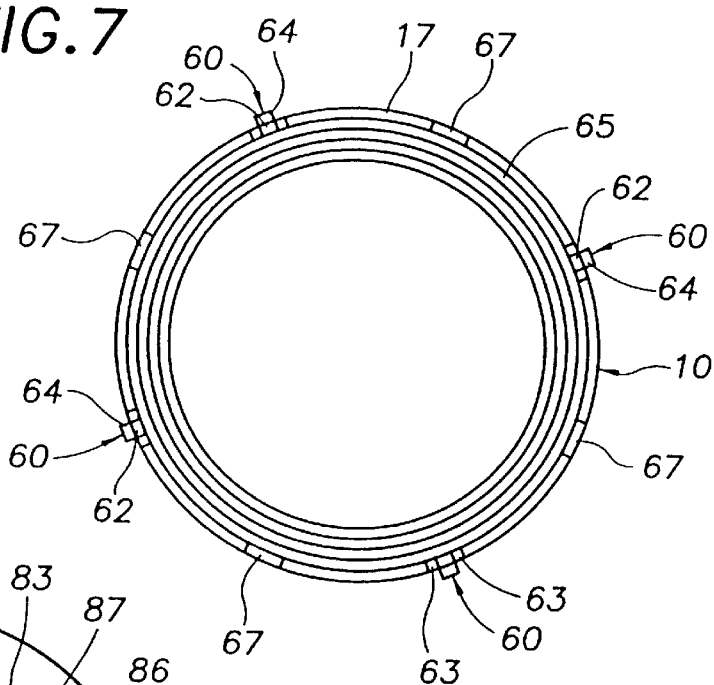
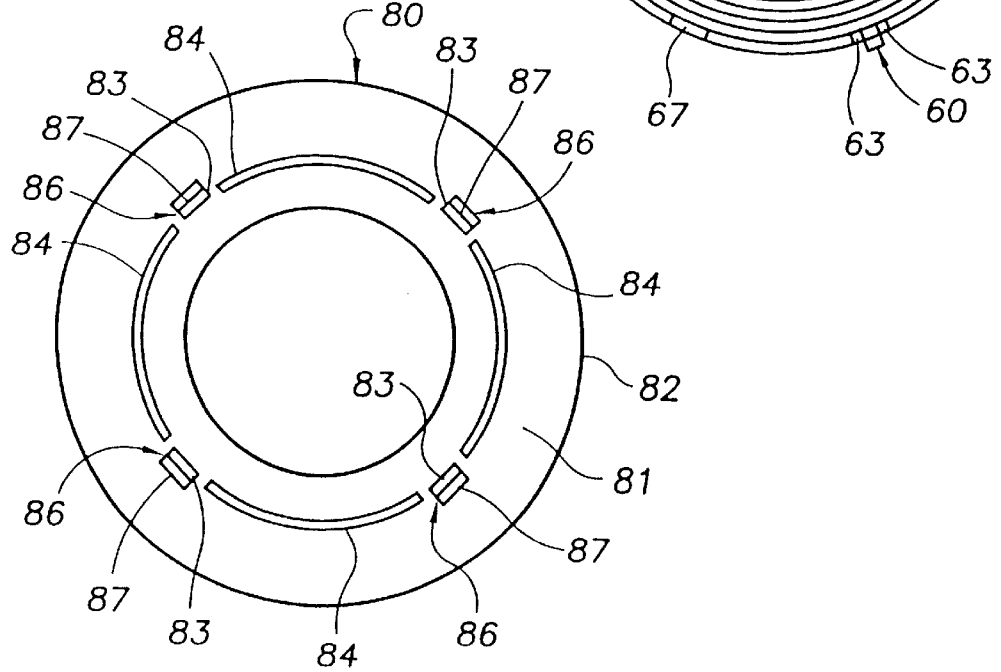

AUTOMOTIVE FUEL FILLER PIPE BALL VALVE ASSEMBLY

CROSS REFERENCE TO RELATED APPLICATION

The present application is related to copending U.S. application Ser. No. 08,991/215, entitled "Automotive Fuel Filler Pipe Housing With Snap-Over Trim Ring" filed contemporaneously and assigned commonly herewith.

FIELD OF THE INVENTION

The invention relates generally to automotive refueling systems, and more particularly to automotive fuel filler pipe ball valve assemblies mountable on automotive body panels.

BACKGROUND OF THE INVENTION

Removable caps and lids disposed on containers such as automotive fuel filler pipes are generally known. It is also known that removable caps are subject to loss and are sometimes a source of contamination, which is undesirable, particularly in automobile fuel system applications. U.S. Pat. No. 5,547,099 entitled "Cover Assembly for Permitting Access Into a Container Without Removal Therefrom" issued Aug. 20, 1996, for example, discloses a spring biased valve device disposed between a base body and a shield, wherein the valve device is pivotal by manipulating an exterior protrusion thereof to open and close an axial bore through the base body without the necessity of a cap or other member removal therefrom.

OBJECTS OF THE INVENTION

The present invention is drawn generally to novel automotive refueling systems, and more particularly novel automotive fuel filler pipe ball valve assemblies.

It is an object of the invention to provide novel automotive ball valve fuel filler pipe assemblies without spring biased valve devices, and automotive ball valve fuel filler pipe assemblies that do not require a door, yet mimic existing door sporting fuel filler pipe housings.

It is another object of the invention to provide novel automotive fuel filler pipe assemblies that may be opened and closed without directly contacting the vehicle exterior, and more particularly fuel filler pipe ball valve assemblies that can be opened and closed remotely, for example from within a passenger cabin and or trunk space of the automobile.

It is another object of the invention to provide novel automotive fuel filler pipe ball valve assemblies that are tamper proof, and more particularly fuel filler pipe ball valve assemblies that are openable by pivoting a shaft member located behind an automotive body panel where it is inaccessible from outside the automobile.

It is a further object of the invention to provide novel automotive fuel filler pipe ball valve assemblies that meet governmental regulations and industry standards pertaining to automotive fuel systems, and more particularly fuel filler pipe ball valve assemblies that readily break away from automotive body panels during impact without separating from the fuel filler pipe and without substantial fuel leakage.

It is yet another object of the invention to provide novel automotive fuel filler pipe ball valve assemblies that are economical, and that may be used with automated refueling systems.

BRIEF DESCRIPTION OF THE DRAWINGS

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators throughout the several views, and wherein:

FIG. 1 is a perspective view of an automotive fuel filler pipe ball valve assembly according to an exemplary embodiment of the invention.

FIG. 3 is a perspective view of a ball valve member according to an exemplary embodiment of the invention.

FIG. 4 is a perspective view of a ball valve member according to another exemplary embodiment of the invention.

FIG. 6 is a partial sectional view of a portion of the housing member and a trim ring member of an automotive fuel filler pipe housing according to an exemplary embodiment of the invention.

FIG. 7 is an end plan view of a housing member according to another exemplary embodiment of the invention.

FIG. 8 is an end plan view of a trim ring member according to an exemplary embodiment of the invention.

DETAILED DESCRIPTION OF THE INVENTION

FIG. 1 is a perspective view of an automotive fuel filler pipe ball valve assembly 100 generally comprising a housing member 10 having a ball valve member 20 disposed pivotally in a ball valve receptacle of the housing member 10. The housing member 10 is coupled to a fuel filler pipe 30 extending from a fuel tank or fuel cell, not shown, and the housing member 10 is mountable in an opening of an automotive body panel, wherein the ball valve member 20 is pivotally actuatable in the housing member 10 for opening and closing the fuel filler pipe 30 as discussed further below.

Figure 2A:
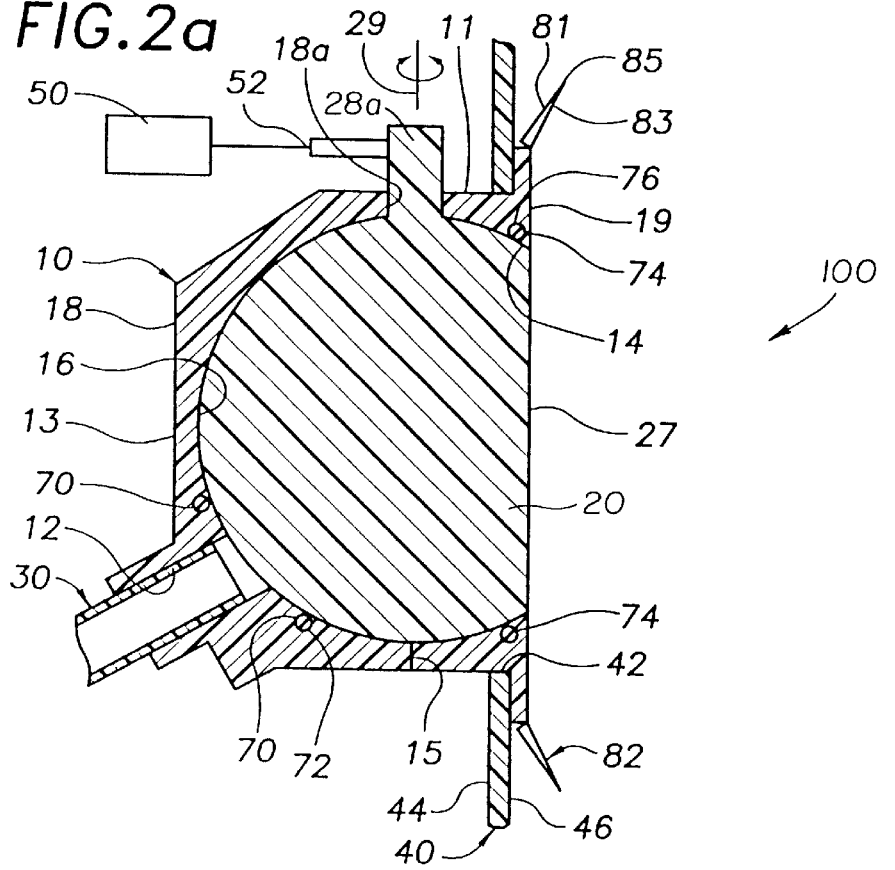
FIG. 2a is a partial sectional view of an automotive fuel filler pipe ball valve assembly in a closed configuration according to an exemplary embodiment of the invention.
Figure 2B:
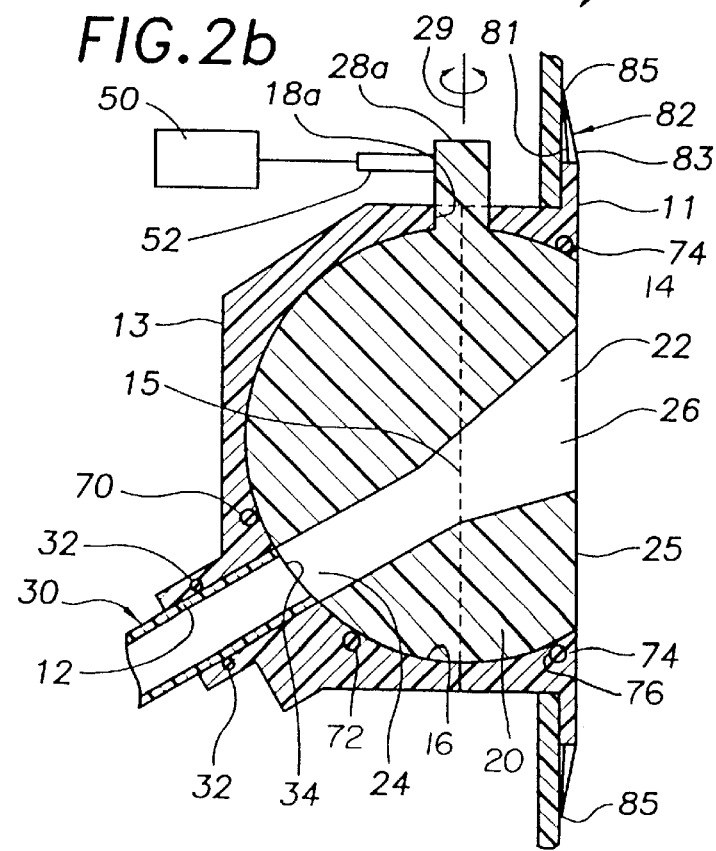
FIG. 2b a partial sectional view of an automotive fuel filler pipe ball valve assembly in an opened configuration according to an exemplary embodiment of the invention.

FIGS. 2a and 2b illustrate more particularly the housing member 10 mounted in an automotive body panel 40 opening 42. The housing member 10 includes an inlet opening 12 and an outlet opening 14 communicating with the ball valve receptacle 16 thereof. The inlet opening 12 of the housing member 10 is disposed on a first side 18 thereof disposed on an interior side 44 of the automotive body panel 40, and the outlet opening 14 of the housing member 10 is disposed on a second side 19 thereof so that the outlet opening 14 is accessible from an exterior side 46 of the automotive body panel 40.

The housing member inlet opening 12 is sealingly coupled to the fuel filler pipe 30. In a preferred embodiment, the housing member 10 is a molded plastic material and the fuel filler pipe 30 is insert molded in the inlet 12 thereof. FIG. 2b illustrates a ring type sealing member 32 disposed between the fuel filler pipe 30 and the housing inlet 12, wherein the sealing member 32 may be disposed about the pipe 30 prior to insert molding the pipe in the housing member 10, thereby providing a leak-proof seal therebetween. In another alternative embodiment, a surface portion of the pipe 30 is treated chemically prior to insert molding the pipe 30 in the housing member 10 to promote bonding between the pipe surface and the housing member 10, thereby providing a leak-proof seal therebetween.

FIGS. 1, 2a, 3 and 4 illustrate the ball valve member 20 including a passage 22 with an inlet opening 24 and an outlet opening 26. The ball valve member 20 is pivotal within the ball valve receptacle 16 of the housing member 10 to couple and de-couple the inlet opening 24 of the ball valve member 20 to the inlet opening 12 of the housing member 10, and to couple and de-coupled the outlet opening 26 of the ball valve member 20 to the outlet opening 14 of the housing member 10, thereby opening and closing the fuel filler pipe 30.

FIGS. 1, 2a and 2b illustrate the ball valve member 20 having at least one shaft member 28a protruding therefrom, and FIG. 3 illustrates an alternative embodiment of the ball valve member 20 having two shaft members 28a and 28b protruding from opposite sides thereof and along a common axis. The shaft member 28a or members 28a and 28b extend through corresponding shaft openings 18a in the housing member 10 to an outer side thereof. The exemplary embodiments of FIGS. 1, 2a and 2b illustrate only a single shaft opening 18a, but other embodiments may include a second shaft opening through an opposite side of the housing member 10 for accommodating the second shaft member 28b protruding from an opposite side of the ball valve member 20 of the type shown in FIG. 3. The ball valve member 20 is thus pivotal in the ball valve receptacle 16 of the housing member 10 about an axis 29 through the shaft member 28a or members 28a and 28b.

In the exemplary embodiment, the housing member 10 comprises a first portion 11 and a second portion 13 coupled along a seam 15 extending across the shaft opening 18a, or openings, of the housing member 10, thereby facilitating assembly of the ball valve member 20 in the housing member 10. The first and second housing portions 11 and 13, or alternatively more portions, may be formed or molded from a fuel resistant plastic material, which portions are adhered together upon assembling the ball valve member 20 in the ball valve receptacle 16 thereof.

FIGS. 2a and 2b illustrate one of the shaft members 28a of the ball valve member 20 engagable from outside the ball valve receptacle 16 of the housing member 10 to pivot the ball valve member 20 about the axis 29 of the shaft member. In the exemplary embodiment, an actuation member 50 is coupled to the shaft member 28a protruding from the ball valve member 20, whereby the actuation member 50 is actuatable remotely to pivot the ball valve member 20 in the ball valve receptacle 16 of the housing member 10. The actuation member 50 may, for example, be an electric servomotor for rotatably driving a worm gear 52 threadably coupled to the shaft member 28a, wherein the actuation member 50 is operable from the passenger cabin of the automobile. The actuation member 50 may alternatively be a manually actuatable mechanical linkage, coupled to a lever arm extending from shaft member 28a, operable from the passenger cabin or trunk space or from outside the automobile. The manually actuatable linkage may be used alone or as auxiliary actuation means in combination with a servomotor actuation member 50. The ball valve member 20 or actuation member 50 may be coupled to one or more sensors, not shown, which detect the position or orientation thereof to provide a sense signal to an on-board processor that controls the automotive electronic ignition system, which may be disabled or enabled depending upon whether the fuel filler pipe is opened or closed.

FIGS. 2a and 2b illustrate the ball valve assembly 100 disposed in the automotive body panel opening 42, wherein the shaft opening 18a of the housing member 10 is disposed on the first side 18 thereof on the interior side 44 of the automotive body panel 40, and the outlet opening 14 of the housing member 10 is accessible from the exterior side 46 of the automotive body panel 40. Locating the shaft member 28a of the ball valve member 20 on the interior side 44 of the body panel 40 and actuating it remotely from within the passenger cabin or trunk space provides a relatively tamper proof fuel system that may be opened and closed without directly contacting the vehicle exterior, which is often dirty and undesirable to handle.

FIGS. 1, 2b, 3 and 4 illustrate the ball valve member 20 having a first exterior side 25 on which the outlet opening 26 thereof is located. The first exterior side 25 of the ball valve member 20 is thus disposed in the outlet opening 14 of the housing member 10 when the outlet opening 26 thereof is coupled to the outlet opening 14 of the housing member 10. FIGS. 2a and 6 illustrate the ball valve member 20 having a second exterior side 27. The second exterior side 27 of the ball valve member 20 is disposed in the outlet opening 14 of the housing member 10 when the outlet opening 26 thereof is de-coupled from the outlet opening 14 of the housing member 10. The exterior sides 25 and 27 of the ball valve member 20 thus form a portion of the exterior side 46 of the automotive body panel 40, depending upon the orientation or position of the ball valve member 20 in the housing member 10. In a preferred embodiment, at least the second exterior side 27 of the ball valve member 20 is contoured to conform with the exterior side 46 of the automotive body panel 40. The first exterior side 25 of the ball valve member 20 may be concaved to facilitate insertion of a fuel nozzle therein. When the fuel filler pipe is closed, the ball valve assembly 100 provides aerodynamic streamlining and cosmetic contouring continuous with the automotive body panel 40 without the requirement of a door common in prior art fuel filler pipe housing assemblies.

According to another aspect of the invention, a first sealing member is disposed generally between the ball valve member 20 and the ball valve receptacle 16 of the housing member 10 about the inlet opening 12 thereof, at least when the inlet opening 24 of the ball valve member 20 is coupled to the inlet opening 12 of the housing member 10. FIGS. 2a and 2b illustrate a first ring member 70 disposed and retained in a first recess 72 in the ball valve receptacle 16 of the housing member 10, wherein the first recess 72 is disposed about the inlet opening 12 thereof. FIG. 2b illustrates an alternative embodiment wherein the first sealing member is formed between the ball valve member 20 and the pipe 30 end 34, which may be shaped to correspond with the ball valve member 20 and is in direct contact therewith. In another embodiment, the ring seal member 70 is disposed between the ball valve member 20 and the pipe 30 end 34. Thus the first recess 72 in this alternative embodiment is formed partially by the end 34 of the pipe 30 and partially by the inlet opening 12 of the housing member 10. The first ring member 70 thus forms generally a seal between the ball valve member 20 and the housing member 10 at the inlet 12 thereof when the inlet opening 24 of the ball valve member 20 is coupled to the inlet opening 12 of the housing member 10, and when the ball valve member 20 obstructs the inlet opening 12 of the housing member 10. The first sealing member 70 thereby provides a leak-proof seal between the housing member 10 and the ball valve member 20 when the assembly 100 is opened for refueling as in FIG. 2b and when the assembly 100 is closed as in FIG. 2a.

According to another aspect of the invention, a second sealing member is disposed between the ball valve member 20 and the ball valve receptacle 16 of the housing member 10 about the outlet opening 14 thereof. FIGS. 2a and 2b illustrate a second ring member 74 disposed and retained in a second recess 76 in the ball valve receptacle 16 of the housing member 10, wherein the second recess 76 is disposed about the outlet opening 14 of the housing member 10. The second ring member 74 thus forms a seal between the ball valve member 20 and the housing member 10 at the outlet 14 thereof when the ball valve assembly 100 is opened and closed, thereby providing a leak-proof seal therebetween. The second sealing member 74 also prevents debris and other potential contaminants from entering the fuel system between the housing member 10 and the ball valve member 20 when the assembly 100 is opened and closed.

The first and second ring members 70 and 74 may be formed alternatively in corresponding recesses on the ball valve member 20. U.S. Pat. No. 5,271,880, entitled "Insert Molding Method For A Seal Member" issued on Dec. 21, 1993 and assigned commonly herewith discloses a method for precisely encapsulating the ring members 70 and 74 in the ball valve member 20 and the housing member 20 during molding operations for the formation thereof.

FIG. 3 illustrates an alternative embodiment for the first and second sealing members, wherein the first and second ring members are formed by mating surfaces of the ball valve member 20 and the housing member 10. In one embodiment the first and second sealing members are a resilient material 21 disposed over at least a portion of the ball valve member 20. The resilient material is, for example, an elastomeric material molded over at least a portion of the ball valve member 20. FIG. 3 illustrates the elastomeric material disposed over all surfaces of the ball valve member except the first and second exterior sides 25 and 27 and the shaft members 28a and 28b. The thickness of the elastomeric material 21 in FIG. 3 is exaggerated considerably. The ball valve member 20 may be formed by adhering two or more fuel resistant plastic members formable previously in molding operations.

FIG. 4 illustrates another alternative embodiment wherein the first and second sealing members are a resilient material 31 disposed between rib portions of the ball valve member 20. According to this embodiment, the ball valve member 20 is formed partially preferably in a molding operation, wherein the partially molded ball valve member includes a plurality of rib members 23a and may include a plurality of relatively transverse rib members 23b. The resilient material 31 in this embodiment is, for example, a microcellular elastomeric foam material disposed between the rib members 23a and formed to correspond with the contour of the ball valve member 20. The rib members 23a are preferably aligned to facilitate formation of closed rings by the resilient material 31 about the inlet and outlet openings 12 and 14 of the housing member 10 when the ball valve member 20 is opened and closed. Portions of rib members 23a and 23b may also be recessed relative to an outer surface of the ball valve member 20 to accommodate the resilient material for this purpose, for example to form a continuous resilient material portion 33 about the first exterior side 25 of the ball valve member 20, which forms a seal between the housing member 10 and the ball valve member 20 about the outlet opening 14.

FIGS. 6 and 7 illustrate the housing member 10 having one or more breakable resilient engagement members 60 protruding therefrom generally about the outlet opening 14 thereof for mounting the housing member 10 on the automotive body panel 40, and more particularly in the opening 42 thereof. FIG. 7 shows the resilient engagement members 60 disposed about the outlet opening 14 of the housing member 10 and protruding radially from an end portion 17 thereof. Each resilient engagement member 60 includes a stem portion 62 formed by adjacent recesses 63 in the housing member 10, a bevelled edge 64 engageable with the opening 42 of the body panel 40 to flex the stem 62 inwardly, which permits installation of the housing member 10 into the body panel 40 opening, preferably from the interior side 44 thereof. FIG. 6 illustrates an engagement portion 66 of the resilient engagement members 60 seated on the body panel exterior side 46 when the housing member 10 is installed in the opening 42 thereof.

The resilient members 60 are breakable under predetermined stress and strain conditions to separate the housing member 10 from the automotive body panel 40, thereby ensuring that ball valve assembly 100 remains intact and coupled to the fuel filler pipe 30 during impacts to prevent fuel spillage as required by governmental and industry fuel systems safety regulations and standards. In the exemplary embodiment, at least a portion of the housing member 10 and the plurality of resilient engagement members 60 formed thereon comprise a unitary molded plastic member. The dimensions and number of plastic material resilient members 60 may be designed to break or fail under predetermined stress and strain conditions occurring during impact with accurate predictability, which is necessary to comply with fuel system safety regulations and standards.

FIGS. 6 and 8 illustrate a trim ring member 80 coupled to the housing member 10. The trim ring member 80 includes a ring member 82, which is annular in the exemplary embodiment, a plurality of curved flange portions 84 and a plurality of resilient tab members 86 protruding from an interior side thereof 81. The curved flange members 84 are disposable in a recess 65, or corresponding recesses, formed in the housing member 10 to align the trim ring member 80 relative thereto. The resilient tab members 86 each include a stem 83 with a bevelled surface 87 engageable with the opening 42 in the body panel 40 to inwardly flex the resilient tab members 86 as the trim ring member 80 is assembled to the housing member 10, which is previously mounted in the body panel 40 as discussed above. FIG. 6 illustrates the resilient tab members 86 also including a surface portion 88 engageable with the interior side 44 of the body panel 40 to retain the trim ring member 80 in assembly with the housing member 10. The curved flange members 84 of the trim ring member 80 also prevent the resilient engagement members 60 of the housing member 10 from flexing inwardly and disengaging from the body panel 40. FIGS. 6 and 7 illustrate the housing member 10 including recesses 67 on the end portion 17 thereof to accommodate the resilient tab members 86 of the trim ring member 80. FIG. 6. also illustrates the body panel 40 having a recess 43 for accommodating the trim ring 82, which forms a gap therebetween to mimic prior art fuel filler pipe housing assemblies.

Figure 5:
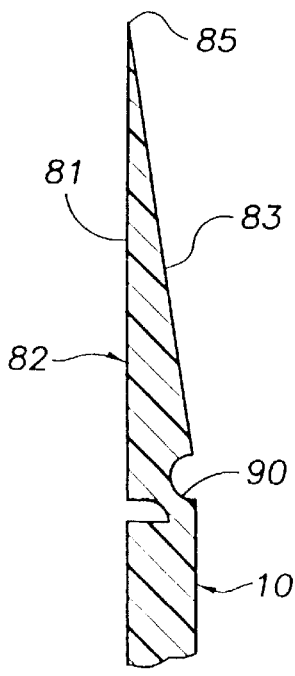
FIG. 5 is an enlarged partial sectional view of a trim ring member of FIG. 2b.

FIGS. 2a, 2b and 5 illustrate the ring member 82 having an interior side 81, an exterior side 83, and an end portion 85. The ring member 82 is coupled to the housing member 10 by a hinge member 90 disposed about outlet opening 14 thereof. The ring member 82 is movable relative to the housing member 10 between a first position where the end portion 85 of the ring member 82 is directed away from the housing member as in FIG. 2a, and a second position where the end portion 85 of the ring member 82 is directed toward the housing member 10 as in FIG. 2b. More particularly, the end portion 85 of the trim member 82 is disposed substantially radially about the housing member 10 in the second position, and the end portion 85 of the trim member 82 is disposed axially beyond the exterior side 19 of the housing member 10 in the first position as discussed more fully in the copending U.S. application Ser. No. 08/991,215 entitled "Automotive Fuel Filler Pipe Housing With Snap-Over Trim Ring" incorporated by reference herein. According to this aspect of the invention, the trim member 82 in the first position is positioned away from the exterior surface 46 of the automotive body panel 40 to permit painting the body panel 40 thereunder during installation of the assembly 100. The trim member 82 is subsequently positionable toward the exterior 46 surface of the automotive body panel 40 in the second position to provide a relatively continuous interface between the housing member 10 and automotive body panel 40. The ring member 82 of FIGS. 2a, 2b and 5 may be formed unitarily with the housing member 10 as shown in FIGS. 2a and 2b, or alternatively and preferably may be coupled to the housing member 10 as illustrated and discussed above in connection with the trim ring member 80 of FIGS. 6–8.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. An automotive fuel filler piper ball valve assembly, comprising:
   a housing member having an inlet opening for fluidically communicating with an automotive fuel filler pipe, an external surface having a predetermined contoured configuration, an outlet opening defined within said external surface of said housing member, and a ball valve receptacle communicating with said inlet opening and said outlet opening of said housing member; and
   a ball valve member having an external surface comprising a predetermined contoured configuration substantially conforming to said predetermined contoured configuration of said external surface of said housing member, having an internal passage having an inlet opening and an outlet opening, and being pivotally disposed within said ball valve receptacle of said housing member between opened and closed positions with respect to said housing member such that when said ball valve member is disposed at said opened position, said inlet and outlet openings of said ball valve member are disposed in fluidic communication with said inlet and outlet openings of said housing member, and when said ball valve member is disposed at said closed position, fluidic communication between said inlet and outlet openings of said ball valve member and said inlet and outlet openings of said housing member is blocked and said external surfaces of said ball valve member and said housing member together form a substantially continuous surface.

2. The assembly as set forth in claim 1, further comprising:
   a first sealing member interposed between said ball valve member and said ball valve receptacle of said housing member and about said inlet opening of said housing member.

3. The assembly of claim 2, the first sealing member is a resilient material disposed over at least a portion of the ball valve member.

4. The assembly of claim 3, the resilient material is an elastomeric material.

5. The assembly of claim 2, further comprising:
   a second sealing member interposed between said ball valve member and said ball valve receptacle of said housing member and about said outlet opening of said housing member.

6. The assembly of claim 5, wherein:
   a second recess is defined within said ball valve receptacle of said housing member about said outlet opening of said housing member; and
   said second sealing member comprises a second ring member disposed and retained within said second recess defined within said ball valve receptacle of said housing member.

7. The assembly of claim 5, the second sealing member is a resilient material disposed over at least a portion of the ball valve member.

8. The assembly of claim 2, wherein:
   a first recess is defined within said ball valve receptacle of said housing member about said inlet opening of said housing member; and
   said first sealing member comprises a first ring member disposed and retained within said first recess defined within said ball valve receptacle of said housing member.

9. An automotive fuel filler pipe ball valve assembly, comprising:
   an automotive body panel having an internal surface, an external surface having a predetermined contoured configuration, and an opening defined therein;
   a housing member mounted within said opening of said automotive body panel and having an inlet opening for fluidically communicating with an automotive fuel filler pipe, an outlet opening defined within an external surface of said housing member, and a ball valve receptacle communicating with said inlet opening and said outlet opening of said housing member; and
   a ball valve member having an external surface comprising a predetermined contoured configuration substantially conforming to said predetermined contoured configuration of said external surface of said automotive body panel, having an internal passage having an inlet opening and an outlet opening, and being pivotally disposed within said ball valve receptacle of said housing member between opened and closed positions with respect to said housing member such that when said ball valve member is disposed at said opened position, said inlet and outlet openings of said ball valve member are disposed in fluidic communication with said inlet and outlet openings of said housing member, and when said ball valve member is disposed at said closed position, fluidic communication between said inlet and outlet openings of said ball valve member and said inlet and outlet openings of said housing member is blocked and said external surfaces of said ball valve member and said automotive body panel together form a substantially continuous surface.

10. The assembly of claim 9, the housing member comprises a first portion and a second portion coupled along a seam across the shaft opening.

11. The assembly as set forth in claim 9, further comprising:
    an opening defined within said housing member so as to extend from said ball valve receptacle to a second external surface of said housing member; and a shaft member defining an axis and extending from said ball valve member and through said opening defined within said housing member so as to protrude externally of said housing member and thereby be engageable externally of said housing member such that said ball valve member is pivotable about said axis of said shaft member between said opened and closed positions.

12. The assembly of claim 11 further comprising an actuation member coupled to the shaft member protruding from the ball valve member and extending through the shaft opening in the housing member, whereby the actuation member pivots the ball valve member in the ball valve receptacle of the housing member.

13. The assembly of claim 11, wherein:
said shaft opening of said housing member disposed upon said second surface of said housing member is disposed interiorly of said automotive body panel; and
said outlet opening of said housing member is disposed upon said external surface of said housing member so as to be accessible externally of said automotive body panel.

14. An automotive fuel filler pipe ball valve assembly, comprising:
an automotive body panel having an opening defined therein;
a housing member having an inlet opening for fluidically communicating with an automotive fuel filler pipe, an external surface, an outlet opening defined within said external surface of said housing member, and a ball valve receptacle communicating with said inlet opening and said outlet opening of said housing member;
a ball valve member having an internal passage having an inlet opening and an outlet opening, and being pivotally disposed within said ball valve receptacle of said housing member between opened and closed positions with respect to said housing member such that when said ball valve member is disposed at said opened position, said inlet and outlet openings of said ball valve member are disposed in fluidic communication with said inlet and outlet openings of said housing member, and when said ball valve member is disposed at said closed position, fluidic communication between said inlet and outlet openings of said ball valve member and said inlet and outlet openings of said housing member is blocked; and
at least one breakable resilient engagement member protruding from said housing member for mounting said housing member upon said automotive body panel and breakable under predetermined stress and strain conditions so as to separate said housing member from said automotive body panel.

15. The assembly of claim 14, wherein:
said at least one breakable resilient engagement member comprises a plurality of breakable resilient engagement members protruding from said housing member and disposed about said outlet opening of said housing member.

16. The assembly of claim 15, the housing member and the plurality of breakable resilient engagement members are plastic.

17. The assembly of claim 14, by further comprising:
a ring member having a peripheral edge portion; and
hinge means disposed about said outlet opening of said housing member for connecting said ring member to said housing member such that said ring member is movable relative to the housing member between a first position at which said peripheral edge portion of said ring member is disposed away from said external surface of said housing member, and a second position at which said peripheral edge portion of said ring member is disposed substantially radially about said housing member so as to define a substantially continuous interface between said housing member and said automotive body panel.

18. The assembly of claim 14, further comprising:
recess means formed within an end portion of said housing member; and
a trim ring member having a plurality of curved flange portions disposed within said recess means of said housing member, and a plurality of resilient tab members protruding from an interior side thereof for engagement with an inner peripheral edge portion of said automotive body panel which defines said opening within said automotive body panel so as to retain said trim ring member upon said housing member.

19. The assembly of claim 14, wherein:
said automotive body panel has an external surface; and
said ball valve member has an external surface disposable within said outlet opening of said housing member when said outlet opening of said ball valve member is fluidically disconnected from said outlet opening of said housing member whereby said external surface of said ball valve member forms a portion of said external surface of said automotive body panel.

20. The assembly as set forth in claim 9, wherein:
said housing member has an external surface having a predetermined contoured configuration such that when said ball valve member is disposed at said closed position, said external surfaces of said ball valve member, said housing member, and said automotive body panel together form a substantially continuous surface.

* * * * *